UNITED STATES PATENT OFFICE.

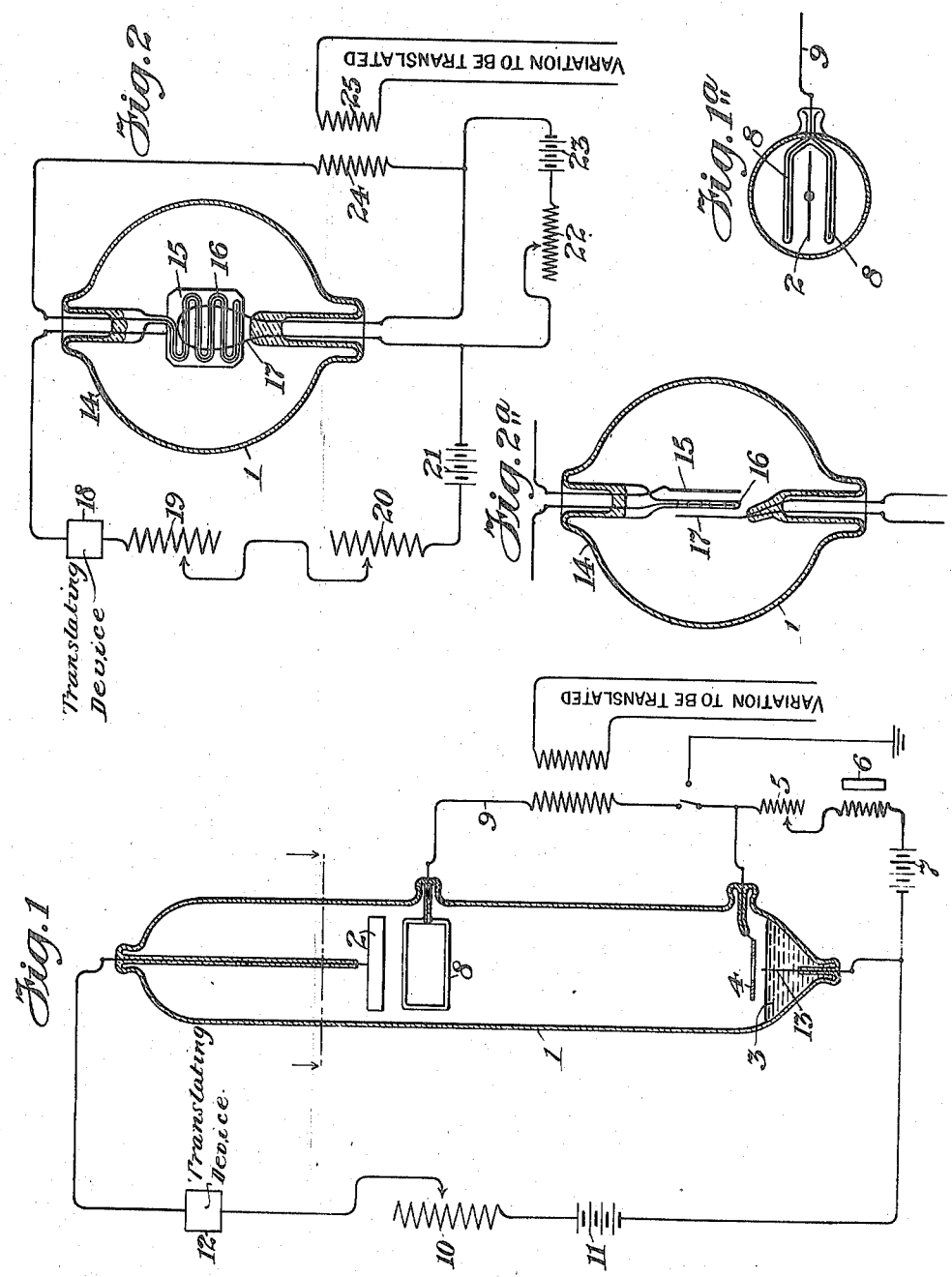

PETER COOPER HEWITT, OF RINGWOOD MANOR, NEW JERSEY.

APPARATUS FOR TRANSLATING ELECTRICAL VARIATIONS.

1,393,369.   Specification of Letters Patent.   Patented Oct. 11, 1921.

Application filed March 12, 1915. Serial No. 13,873.

*To all whom it may concern:*

Be it known that I, PETER COOPER HEWITT, a citizen of the United States, and resident of Ringwood Manor, county of Passaic, State of New Jersey, have invented certain new and useful Improvements in Apparatus for Translating Electrical Variations, of which the following is a specification.

My invention relates to means for controlling one circuit by another and is serviceable for affecting a circuit by potential variations in another circuit, insulated from it, even though the currents are alternating currents of very high frequency.

The invention consists of a vacuum, gas or vapor tube consisting of a positive electrode, a negative electrode capable of receiving positive current and of a conductor inside the tube, hereafter called the potential terminal, insulated from the gas or vapor path in the same manner as if it were entirely covered by a coating of insulating material whereby it affects the path between the main electrodes by its potential charge and not by current passing from it to the path by conduction.

It is useful as a receiver for wireless telegraphy and telephony and for transferring telephone currents from one circuit to another and for amplifying and relaying such currents and will serve to translate rapidly varying currents of high frequency, and translate variations of energy.

My invention is best explained by a concrete device, as shown in the drawing, and by a setting forth of the action of said device.

In the drawings, Figure 1 represents a device embodying my invention as connected in circuit. Fig. 1ª is a detail. Figs. 2 and 2ª illustrate a modified form.

In Fig. 1, is shown a vacuum tube, 1, having a positive electrode, 2, a negative electrode, 3, and a keep alive, 4, and a circuit connecting 3 and 4 consisting of resistance, 5, inductance, 6, and a storage battery, 7, for maintaining the electrode 3 in active condition.

A conductor, 8, here called potential terminal, is shown insulated from the vacuum, gas or vapor, and consisting of a material like platinum, for instance, covered by insulating material like glass, for instance, so that the conductor is prevented from carrying current to the interior of the device by true conduction, but is only capable of affecting the interior by reason of the electric charge impressed on the conductor conveyed by means of the conductor, 9, connected to it and passing through the wall of the vessel.

A circuit is connected to the positive electrode 2 consisting of resistance, 10, a battery, 11, and a translating device or indicating instrument, 12, with leads connecting the same to negative electrode 3 or, if preferred, to electrode 4. Current is first caused to pass between auxiliary positive electrode 4 and negative electrode 3 in a desired quantity, say, from ½ to three and one-half amperes, by suitably adjusting the various parts of the circuit 5, 6, 7: it being of advantage that the inductance 6 be large. The negative electrode 3 is stabilized, in case a liquid electrode is used, such as mercury, by a projection, 13, such as platinum or tungsten.

The circuit to the positive electrode 2 is adjusted to pass the desired current by means of the resistance 10, battery 11, and the translating device 12. The current in this circuit is selected according to requirements and may be very small if the device is required to translate very minute variations of energy, as very small potential variations impressed on the potential terminal or conductor 8 will not affect currents of over a certain magnitude, with sufficient force to yield practical results.

The potential variations or energy variations to be translated are applied by means of conductor 9 to the potential terminal, and these variations affect the current flow in the tube circuit, including the indicator, from the positive electrode 2.

The device is sensitive to potential variations applied to potential terminal 8. If the device is used for energy variations of low potential, in order that it may be most sensitive to such variations, the potential of the energy variations should be raised to the highest possible potential at the potential terminal by any of the well known expedients to raise the potential of variations. As there is no current flow from potential terminal, 8, the necessary raising of potential may be brought about with an exceedingly small amount of energy to be translated. One terminal of such a device should be connected at 9, and the other side of the circuit to any of the other leads entering the device, or may be connected to ground or the capacity of the circuit may be sufficient.

Instead of a plate as shown as the potential terminal at 8, Fig. 1, a perforate terminal such as a grid of insulated wire may be used and may be turned in a horizontal position instead of vertical as shown at 8, in Fig. 1. One form of such grid is shown at 16, in Fig. 2. The perforate terminal or the wire forming the grid may be covered with a coating of glass, preferably thin, or other suitable insulating material.

In place of a mercury electrode maintained in a broken down state by current flow from an auxiliary positive electrode and independent source of current, an incandescent body may be used as the electrode, such as the filament of an incandescent lamp, which may be maintained hot by an independent circuit.

Fig. 2 comprises a device wherein a filament, 17, serves as a negative. The filament 17 is included in a separate circuit consisting of a battery, 23, and a variable resistance 22 for maintaining it incandescent so that it may act as a negative to receive positive current.

Variations are applied by means of primary coil, 25, acting on secondary coil, 24, which serves as a potential raising device; one terminal of 24 is connected to the potential grid 16; the other terminal is connected to the filament circuit. The positive electrode, 15, is connected to the indicating instrument, 18, included in a circuit having inductance, 19, resistance, 20, battery, 21, and connected to the negative electrode terminal, the circuit being completed by means of the path between the electrodes 15 and 17, inside the device. The potential impressed on the potential electrode 16 varies the current flow in the circuit 15, 18, 19, 20, 21, and 17.

Any suitable translating device or indicating instrument, such as the primary of a transformer, the secondary of which may be utilized for any desired purpose, or a telephone receiver, or a relaying apparatus, may be used at 12 or 18 in Figs. 1 and 2.

The device is also useful when alternating currents are applied to the main electrodes instead of direct current here illustrated, in which case the device will rectify the current and pass direct current impulses.

With very high frequency currents the device is very useful.

I claim as my invention:

1. In an apparatus for translating electrical variations, an electric device having a potential terminal located therein and completely covered with insulating material, said insulated potential terminal being separately mounted in said device.

2. In an apparatus for translating electrical variations, a container, electrodes therein separated by a vacuum, gas or vapor space, and a conductor within the container covered throughout with insulating material.

3. In a vacuum, gas or vapor apparatus, a container having electrodes and a potential terminal within the container covered throughout with insulating material, said internal potential terminal being in operative relation to the electrodes and spaced apart therefrom, and means for impressing electrical variations upon said internal potential terminal.

4. In an electric apparatus, a container having electrodes therein separated by a vacuum, gas or vapor space, and a conductor within the container covered throughout with insulating material, and means for impressing electrical variations upon said internal conductor.

5. In an electric apparatus, a container having positive and negative electrodes therein separated by a vacuum, gas or vapor space, means for passing current between said electrodes, and a conductor within the container covered throughout with insulating material in operative relation to the current path between the electrodes, and means for impressing electrical variations on said internal conductor.

6. The combination in a vacuum, gas or vapor device, of two electrodes having a current path between them and a conductor within the device interposed between the two electrodes and insulated from the current path.

7. A vacuum, gas or vapor device, having two electrodes and a current path between them and a conductor within the device interposed between the two electrodes and insulated from the current path, in combination with a source of electrical variations connected with the insulated conductor, a receiving circuit, and a translating device therein.

8. In a vacuum, gas or vapor device, two electrodes having a current path between them, a conductor within the device interposed between them and insulated from the current path, in combination with means for raising the electrical energy applied to the insulated conductor to the highest practical potential.

9. A vacuum, gas or vapor device having positive and negative electrodes, a conductor within the device spaced apart from said electrodes and insulated from the vacuum, gas or vapor path between the positive and negative electrodes in combination with means for impressing potential variations on the insulated conductor, a circuit including one of the main electrodes of the device, and a translating device responsive to currents therein.

10. In a vacuum, gas or vapor device, two electrodes having a current path between them, a conductor within the device interposed between the two electrodes and insulated from the current path, in combination with a source of electrical variation acting on the insulated conductor, and means for raising the potential of the said variations.

11. The combination with an exhausted container, electrodes therein having a vacuum, gas or vapor current path between them, of a body of conducting material within the container spaced apart from said electrodes and insulated from the current path, and means for making electrical connection with the insulated conductor through the walls of the container.

12. The combination with an inclosing chamber, 1, a positive electrode, 2, a negative electrode, 3, and a potential terminal within the chamber spaced apart from said electrodes and insulated from discharges passing between the said electrodes.

13. In an apparatus for amplifying electrical variations, an electric device having electrodes, means for passing electric current between said electrodes, a body of conducting material within said device interposed in the path between the electrodes and insulated from said path.

14. An amplifier for electrical variations, comprising an evacuated container, a positive and a negative electrode, means for passing electric currents between the same, an insulated potential terminal within said container and spaced apart from said electrodes and receiving electrical charges corresponding to the variations to be amplified and affecting the current path but insulated therefrom.

Signed at New York, in the county of New York and State of New York, this 11th day of March, A. D. 1915.

PETER COOPER HEWITT.

Witnesses:
  WALTER E. F. BRADLEY,
  HAROLD B. WOODWARD.